US005195653A

United States Patent [19]

Gerrans

[11] Patent Number: 5,195,653

[45] Date of Patent: Mar. 23, 1993

[54] SLIDE MOUNTER WITH IMPROVED SLIDE MOUNT ADVANCE

[75] Inventor: Wilbur Gerrans, Marysville, Wash.

[73] Assignee: Pakon, Inc., Minnetonka, Minn.

[21] Appl. No.: 820,988

[22] Filed: Jan. 15, 1992

[51] Int. Cl.$^{5}$ .............................................. B65G 59/00

[52] U.S. Cl. ...................................... 221/274; 53/520; 271/133; 221/276

[58] Field of Search ............... 221/268, 270, 274, 276; 271/133, 135; 53/250, 520; 414/797.9

[56] References Cited

U.S. PATENT DOCUMENTS

| | | | |
|---|---|---|---|
| 1,281,014 | 10/1918 | Huneke | 271/135 |
| 1,644,695 | 10/1927 | Sieg | 271/135 |
| 2,434,785 | 6/1948 | Blumenstein | 221/276 |
| 3,521,423 | 7/1970 | Koeppe et al. | 53/23 |
| 3,524,299 | 8/1970 | Mundt et al. | 53/23 |
| 3,788,031 | 1/1974 | Florjancic | 53/123 |
| 3,977,280 | 8/1976 | Mundt et al. | 83/42 |
| 4,004,340 | 1/1977 | Urban | 29/417 |
| 4,135,343 | 1/1979 | Urban et al. | 53/435 |
| 4,168,784 | 9/1979 | Heier | 221/274 |
| 4,237,678 | 12/1980 | Thompson | 53/520 |
| 4,331,260 | 5/1982 | Euteneuer et al. | 221/19 |
| 4,344,611 | 9/1982 | Morita | 271/135 |
| 4,345,707 | 8/1982 | Urban et al. | 226/68 |
| 4,355,748 | 10/1982 | Willenbring | 226/67 |
| 4,391,082 | 7/1983 | Diesch | 53/520 |
| 4,516,386 | 5/1985 | Willenbring | 53/520 |
| 4,543,771 | 10/1985 | Jensen et al. | 53/520 |
| 4,603,539 | 8/1986 | Müssig et al. | 53/435 |
| 4,612,754 | 9/1986 | Neuhold et al. | 53/457 |
| 4,673,815 | 6/1987 | Fruth et al. | 250/548 |
| 4,738,040 | 4/1988 | Neuhold et al. | 40/152 |

*Primary Examiner*—H. Grant Skaggs
*Attorney, Agent, or Firm*—Kinney & Lange

[57] ABSTRACT

An improved slide mount advance mechanism advances a slide mount to an insertion station of a slide mounting apparatus, where the slide mount receives a film transparency to form a photographic slide. The mechanism includes a slide ejector designed to contact a bottom slide mount in a slide magazine and advance the slide mount from the slide magazine to the insertion station. The slide ejector contacts the slide mount through a rear slide ejector opening of the slide magazine to force the slide mount through a front slide mount opening of the slide magazine to a slide track. The apparatus also includes a mechanism for aligning the bottom slide mount at or above an upper edge of the slide ejector while maintaining the bottom slide mount in a position to be engaged by the slide ejector. The aligning mechanism restricts the ejection of multiple slide mounts from the slide magazine to assure proper operation.

14 Claims, 7 Drawing Sheets

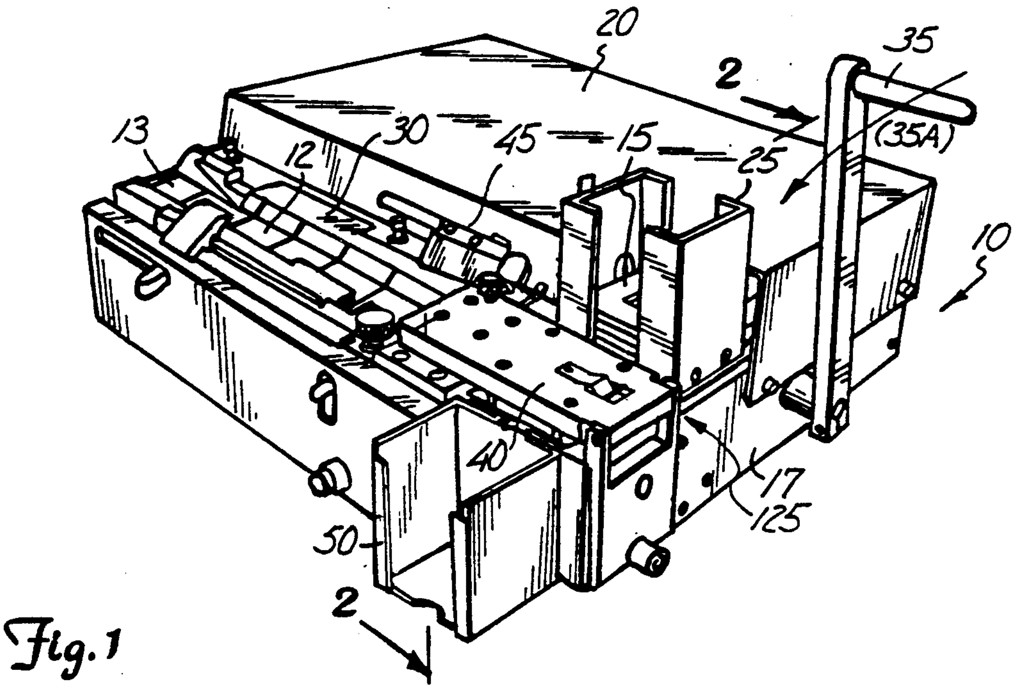
Fig. 1
Fig. 6
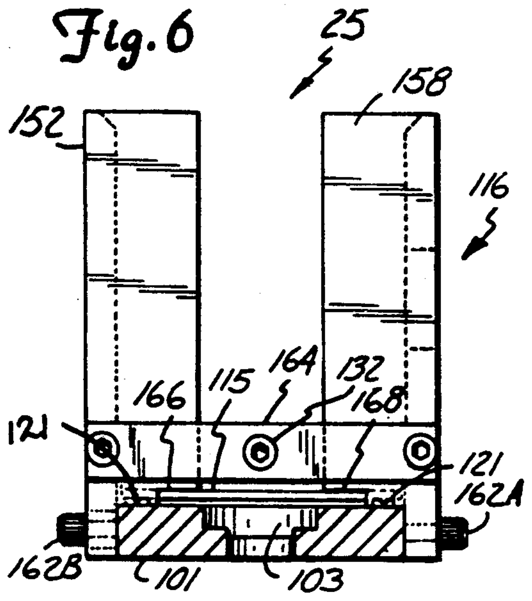
Fig. 7
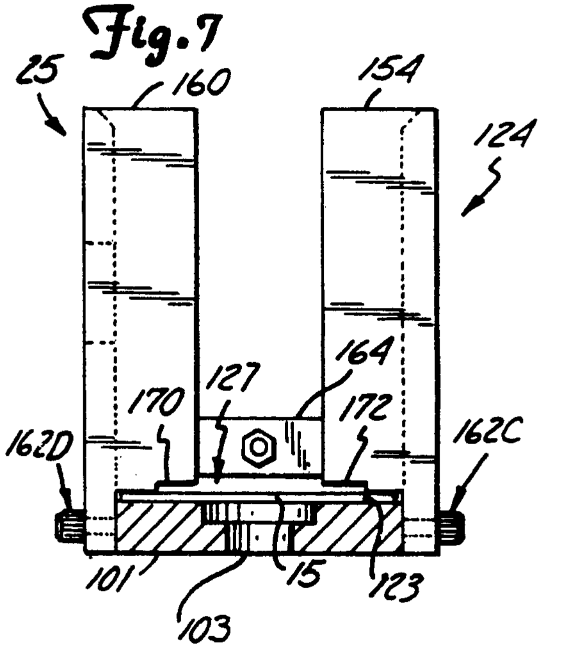

SLIDE MOUNTER WITH IMPROVED SLIDE MOUNT ADVANCE

REFERENCE TO COPENDING APPLICATIONS

Reference is made to the following commonly assigned applications entitled as follows:

(1) Slide Mounter with Bridging Film Advance (Ser. No. 07/822,188); (2) Slide Mounter with Spring Loaded Insert Guides (Ser. No. 07/821,999); (3) Slide Mounter with Movable Knife Assembly (Ser. No. 07/821,025); (4) Slide Mounter with Motor/Arm Interlock (Ser. No. 07/821,752); (5) Slide Mounter with In-Plane Film Pusher (Ser. No. 07/821,762); and (6) Slide Mounter with Positive Stop Film Placement (Ser. No. 07/822,029).

BACKGROUND OF THE INVENTION

The present invention relates to an apparatus for advancing a slide mount to an insertion station of a slide mounting apparatus for receiving a film transparency.

Photographic film transparencies are generally severed from a photographic film web and inserted into a slide mount to prepare a photographic slide for use with a slide projector or other visualizing means. A variety of different types of slide mounts and slide mounting apparatus have been developed. One particular type of slide mount is available from the assignee of the present invention, Pakon, Inc.

Slide mounts are generally defined by upper and lower frame sections connected along an outer border to define a pocket therebetween. An insertion opening is included to open the pocket defined between the upper and lower frame sections of the slide mount to insert the film transparency. The film transparency is advanced through the pocket of the slide mount to position the developed image of the film transparency within an aperture of the slide mount to prepare the photographic slide.

Automatic and semi-automatic slide mounters are designed to continuously mount a plurality of film transparencies into slide mounts of the type described. Several U.S. Patents (U.S. Pat. Nos. 4,391,082 (Diesch), 4,331,260 (Euteneuer et al.), 4,516,368 (Willenbring)) disclose slide mounters of the general type contemplated. The slide mounts are stored for operation in a slide magazine. As needed, a slide mount is ejected from the slide magazine and advanced to an insertion station where the film transparency is inserted into the pocket of the slide mount. More specifically, the slide mount is ejected from the slide magazine through a slide mount opening to a slide track which is aligned with the insertion station of the apparatus. Slide mounts are continually fed from the slide magazine through the slide mount opening to the slide track and advanced towards the insertion station to produce a plurality of photographic slides.

Typically, a slide ejector contacts a slide mount to initiate the movement thereof through the slide mount opening of the slide magazine to the slide track. The slide magazine is configured to release a single slide mount at a time to the slide track. It is important that only a single slide mount be ejected at a time for the apparatus to continue operation. However, on occasion the slide ejector contacts more than one slide mount and attempts to force more than one slide mount through the slide mount opening designed for a single slide mount. The force of the slide ejector is sufficient, at times, to cause several slide mounts to become wedged within the slide mount opening. This causes the apparatus to jam, and the slide mount opening must be cleared of the slide mounts before operation of the apparatus can continue.

Thus, there has been a continuing need to develop a slide mounter which reliably advances only a single slide mount to the insertion station for each operation cycle. More particularly, there has been a continuing need to develop an apparatus for advancing a slide mount wherein only a single slide mount is forced through the slide mount opening to the slide track.

SUMMARY OF THE INVENTION

The present invention relates to an apparatus for advancing a slide mount to an insertion station of a slide mounting apparatus. The apparatus is designed to eject a slide mount from a slide magazine holding a plurality of slide mounts, and advance the slide mount to an insertion station where a photographic film transparency is introduced into the slide mount to prepare a photographic slide.

The apparatus for advancing the slide mounts includes a slide ejector movable between a retraction position and an ejection position for advancing a bottom slide mount from the slide magazine to the insertion station. The slide ejector is designed to contact the bottom slide to advance it through a slide mount opening of the slide magazine. The apparatus includes means for aligning an upper surface of the bottom slide mount at or above an upper edge of a front contact surface of the slide ejector so that the slide ejector contacts only the bottom slide mount even though the height of the front contact surface is large enough to contact more than a single slide mount. The means for aligning the bottom slide mount so that the slide ejector contacts only a single slide mount restricts the advancement of more than one slide mount by the slide ejector through the slide mount opening of the slide magazine

BRIEF DESCRIPTION OF THE DRAWINGS

The invention will be further described with reference to the accompanying drawings where like numbers refer to like parts in several views.

FIG. 1 is a perspective view of a photographic slide mounter of the present invention.

FIG. 6 illustrates a rear surface of the slide magazine illustrated from line 6—6 of FIG. 5.

FIG. 7 illustrates a front surface of the slide magazine illustrated from line 7—7 of FIG. 5.

Figure 2:
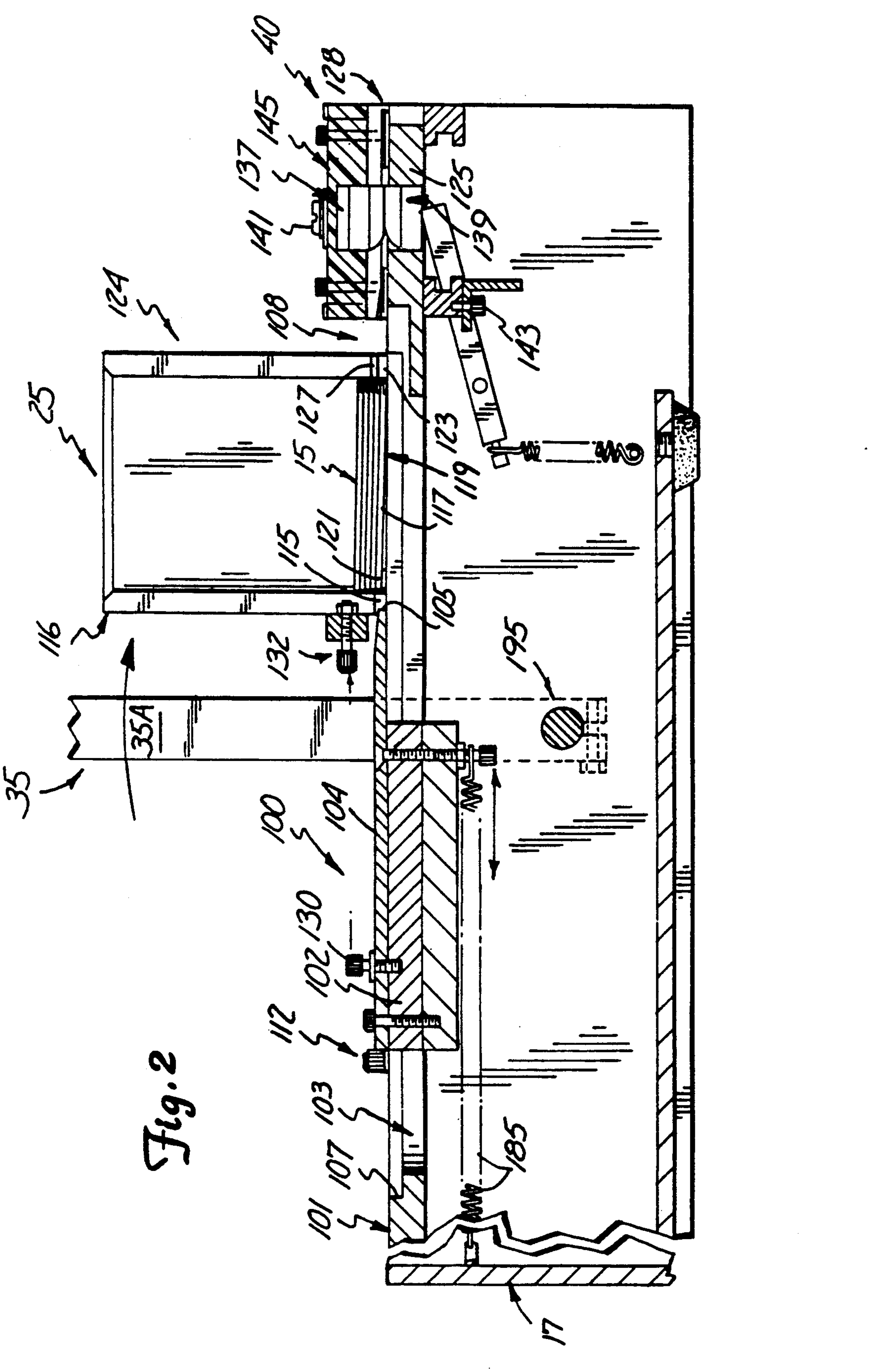
FIG. 2 is a cross-sectional view of the slide ejector of the slide mounter of the present invention as taken along line 2—2 of FIG. 1.

While the above-identified drawings figures set forth in a preferred embodiment, other embodiments of the present invention are also contemplated, thus, this disclosure presents an illustrated embodiment of the present invention by way of representation and not limitation. It should be understood that numerous other modifications and embodiments can be devised by those skilled in the art which fall within the scope and spirit of the principles of this invention. It should be noted that the figures have not been drawn to scale.

DETAILED DESCRIPTION OF THE PREFERRED EMBODIMENT

FIG. 1 shows a semi-automatic slide mounter 10 which is used to sever individual film transparencies 12 from a photographic film web 13 for insertion into a slide mount 15 to prepare a photographic slide. The slide mounter 10 includes a base frame 17 and a cover 20. The slide mounts 15 are stored in stacked relation in a slide magazine 25. The photographic film web 13 is supported for movement along a film track 30.

An operating lever 35 initiates the operation of the slide mounter 10. In operation, the operating lever 35 is advanced forward (arrow 35A) to eject a slide mount 15 from the slide magazine 25. The ejected slide mount 15 is advanced to an insertion station 40. A motorized drive assembly (not shown) is synchronized with the operating lever 35 to advance the film web 13 along the film track 30 toward the insertion station 40. A knife assembly 45, which is operated by the operating lever 35 and aligned with the film track 30, is used to sever individual film transparencies 12 from the film web 13. Each time the operating lever 35 ejects a slide mount 15, the motorized drive advances the film web 13 along the film track 30 to sever a leading film transparency 12 and insert the severed film transparency 12 into the ejected slide mount 15. An operation cycle of the motor begins each time the operating lever 35 is released from a forward position. A catch magazine 50 holds the photographic slides after each is prepared.

As shown in FIG. 2, individual slide mounts 15 are ejected from the slide magazine 25 during operation by a slide ejector 100. The slide ejector 100 is adapted for operation along an ejector track 101 connected to the frame 17. In particular, the ejector track 101 is perpendicular to the film track 30. The slide ejector 100 includes an ejector mount 102 movable along an ejector slot 103 in the ejector track 101. The ejector mount 102 supports an ejector pusher 104 having a tapered front contact surface 105 designed to engage individual slide mounts 15. The slide ejector 100 is movable along the ejector track 101 within the ejector slot 103 generally between a retracted end 107 and an advanced end 108 thereof.

Prior to operation, the slide ejector 100 rests against a retracted stop 112 near the retracted end 107 of the ejector track 101. When the operating lever 35 is advanced forward (arrow 35A), the slide ejector 100 is advanced along the ejector track 101 toward the slide magazine 25 to eject a slide mount 15 from the slide magazine 25. The operation of the slide ejector 100 along the ejector track 101 is progressively illustrated in FIGS. 2–4.

As shown in FIG. 2, the ejector mount 102 of the slide ejector 100 is moved toward the slide magazine 25 to advance the pusher 104 through a bottom rear slide ejector opening 115 at a rear end 116 of the slide magazine 25. As the pusher 104 advances through the bottom rear slide ejector opening 115, the front contact surface 105 of the pusher 104 contacts a bottom slide mount 117 supported by a supporting surface 119 of the slide magazine 25.

Figure 2A:
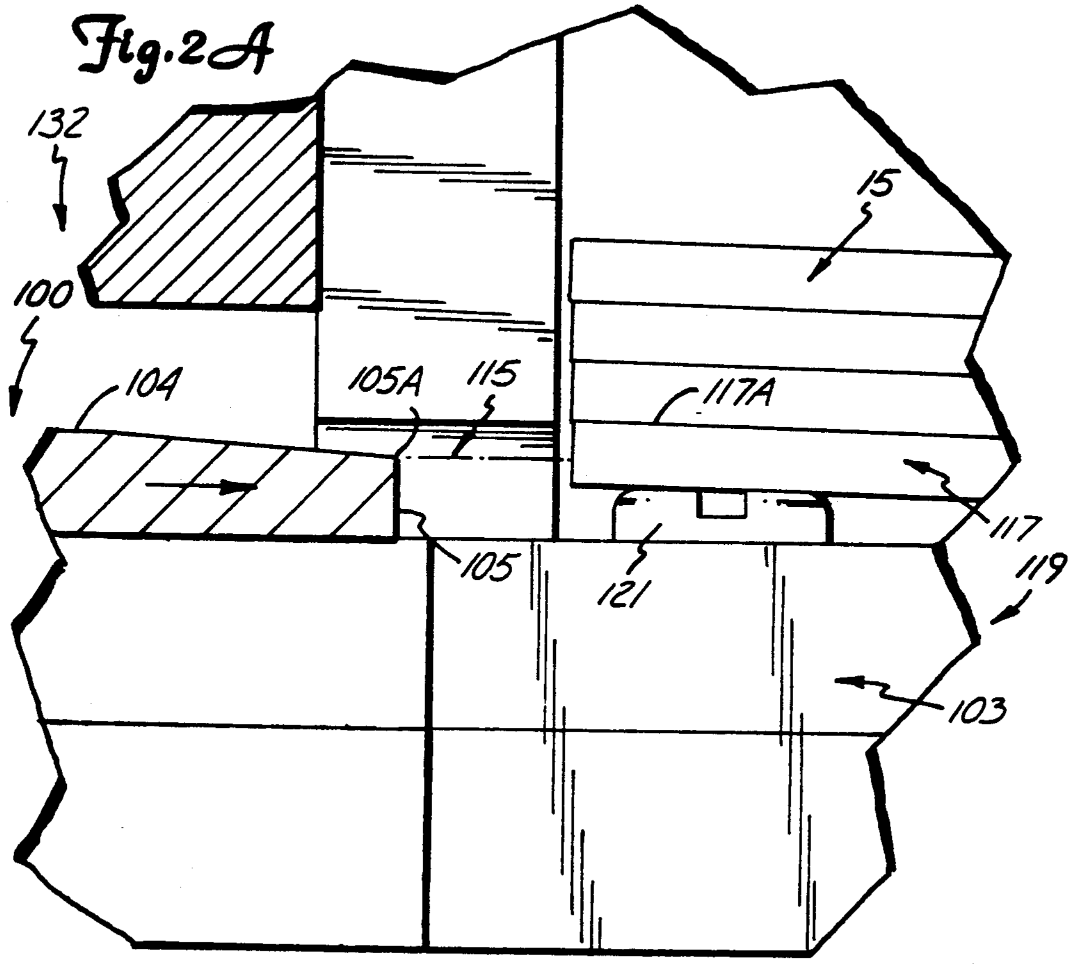
FIG. 2A is a detailed illustration of the operation of the slide ejector as shown in FIG. 2.

As illustrated in detail in FIG. 2A, elevating screws 121 are attached to the bottom supporting surface 119 of the slide magazine 25 to contact a lower surface of the bottom slide mount 117. The elevating screws 121 raise the rear edge of the bottom slide mount 117 to position the rear edge of the bottom slide mount 117 relative to the advancing ejector pusher 104. In particular, the height of the elevating screws 121 is defined so that the elevating screws 121 raise the bottom slide mount 117 so that an upper surface 117A of the bottom slide mount 117 is at or above an upper edge 105A of the front contact surface 105 of the ejector pusher 104 while maintaining the bottom slide mount 117 in a position to be engaged by the front contact surface 105 of the pusher 104. The elevated position of the bottom slide mount 117 assures that the ejector pusher 104 will contact only the bottom slide mount 117 during an advancement cycle of the slide ejector 100.

The thickness (height) of the pusher 104 and the front contact surface 105 thereof is increased because of the elevated height of the bottom slide mount 117 supported by the elevating screws 121. That is, it is possible to increase the thickness of the pusher 104 so that it is significantly greater than the thickness of the slide mount 15 and still capture a single slide mount in an ejection stroke. The thicker pusher 104 of the present invention defines a large front contact surface 105 which will maintain contact with the slide mount 117 after it is lowered from the elevating screws 121 and advanced for ejection.

In prior designs, where the pusher is not as thick (i.e., where the pusher is not as thick (height) as the slide mount 15) the pusher 104 (front contact surface 105) has a propensity to "buckle under" or, lift and slide under the slide mount 117. This is particularly so if there is not sufficient weight on the bottom slide mount 117 (i.e., the slide magazine is nearly empty of slide mounts 15) to maintain alignment and contact of the front contact surface 105 of the pusher 104 with the slide mount 15. When the pusher 104 buckles under the slide mount 117, the slide mount 117 does not properly eject without manual intervention. However, the increased thickness (height) of the pusher 104 (front contact surface 105) provides a larger contact surface to maintain alignment and contact with the slide mount 117 through an entire ejection stroke.

Figure 3:
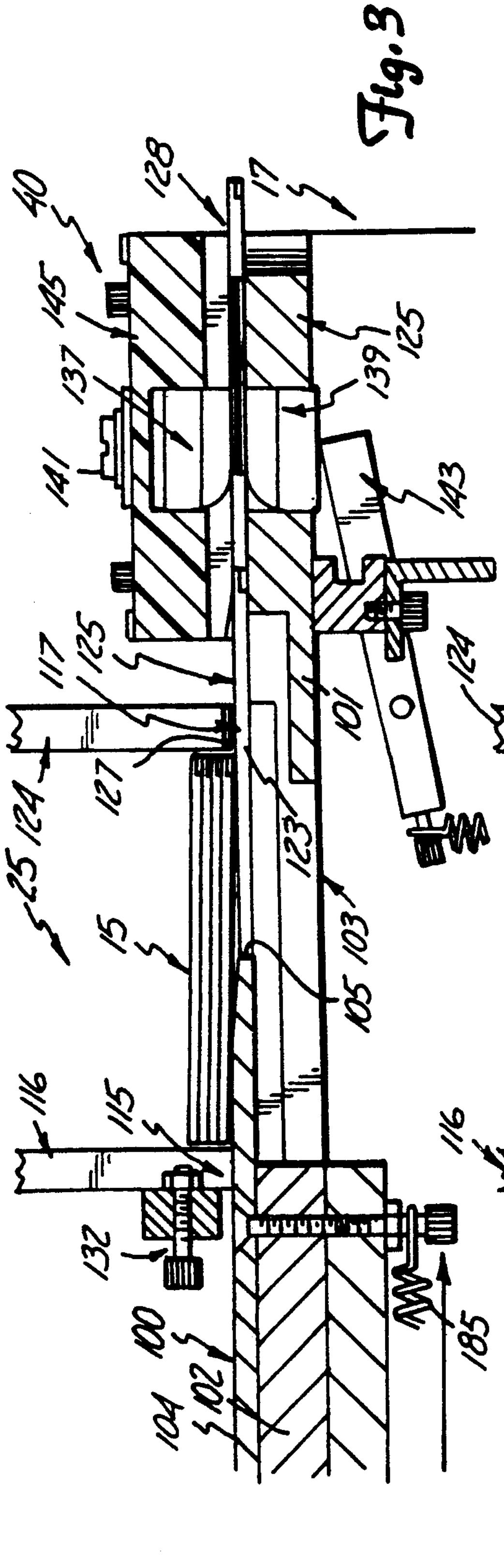
FIG. 3 is a detailed cross-sectional view of the slide ejector, similar to the cross-sectional view of FIG. 2, illustrating operation of the slide ejector along a slide ejector track.
Figure 4:
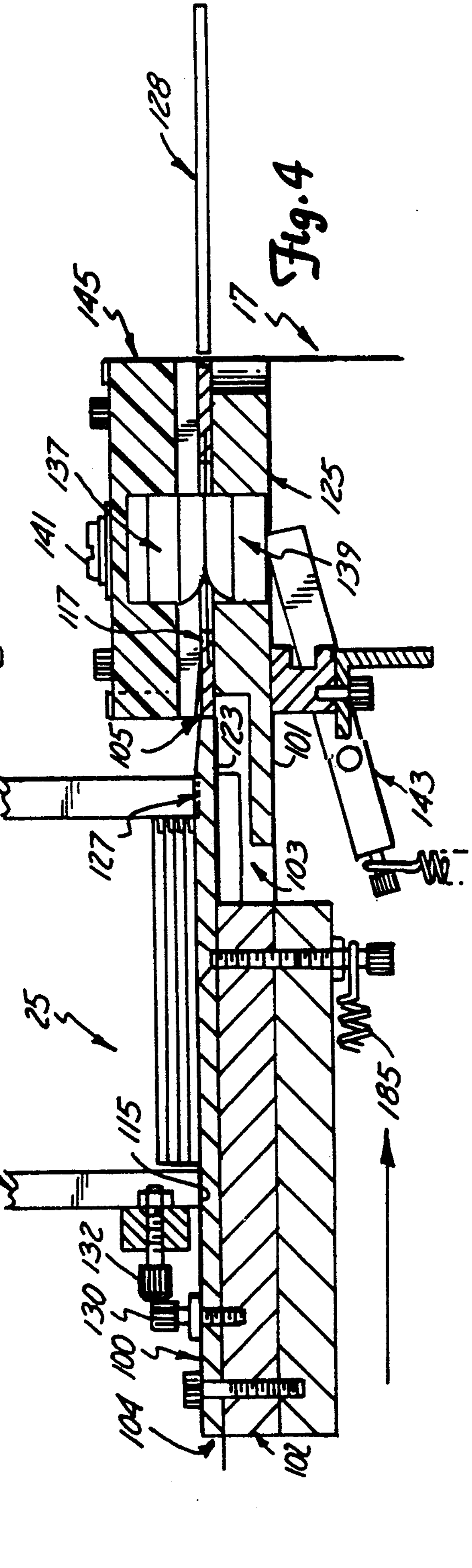
FIG. 4 is a detailed cross-sectional view of the slide ejector, also similar to FIG. 2, illustrating an ejection position of the slide ejector along the ejector track.

The advancement of the ejector pusher 104 continues along the ejector track 101 through the slide magazine 25 as illustrated in FIG. 3. As the ejector pusher 104 advances, the ejector pusher 104 forces the bottom slide mount 117 through a bottom slide mount opening 123 on a front end 124 of the slide magazine 25 onto a slide track 125 aligned with the insertion station 40. The slide track 125 and the film track 30 are perpendicular to one another (FIG. 1) and intersect at the insertion station 40. In particular, the slide track 125 is defined by a continuum of the ejector track 101 extending past the front end 124 of the slide magazine 25 (FIGS. 2–4). The slide track 125 extends to the insertion station 40 to define a supporting surface for the slide mount 15 at station 40.

As shown in FIG. 4, the slide ejector 100 is advanced until the ejector pusher 104 extends through a front slide ejector opening 127 on the front end 124 of the slide magazine 25 to force the bottom slide mount 117 along the slide track 125 to the insertion station 40 to receive a film transparency 12. As the slide ejector 100 advances the slide mount 117 to the insertion station 40, it forces a prepared photographic slide 128 from the insertion station 40 to the catch magazine 50 (FIG. 1).

The slide ejector 100 is advanced until a stop contact 130 mounted to an exposed upper surface of the ejector pusher 104 meets a corresponding stop contact 132 on the rear end 116 of the slide magazine 25. The stop contact 130 is attached to the ejector pusher 104 of the slide ejector 100 opposite the front contact surface 105 of the pusher 104. The engagement of the corresponding stop contacts 130 and 132 defines an ejection position for the slide ejector 100. In the ejection position, the pusher 104 extends through the front slide ejector opening 127 to force the slide mount 15 to the insertion station 40 (FIG. 4).

Figure 5:
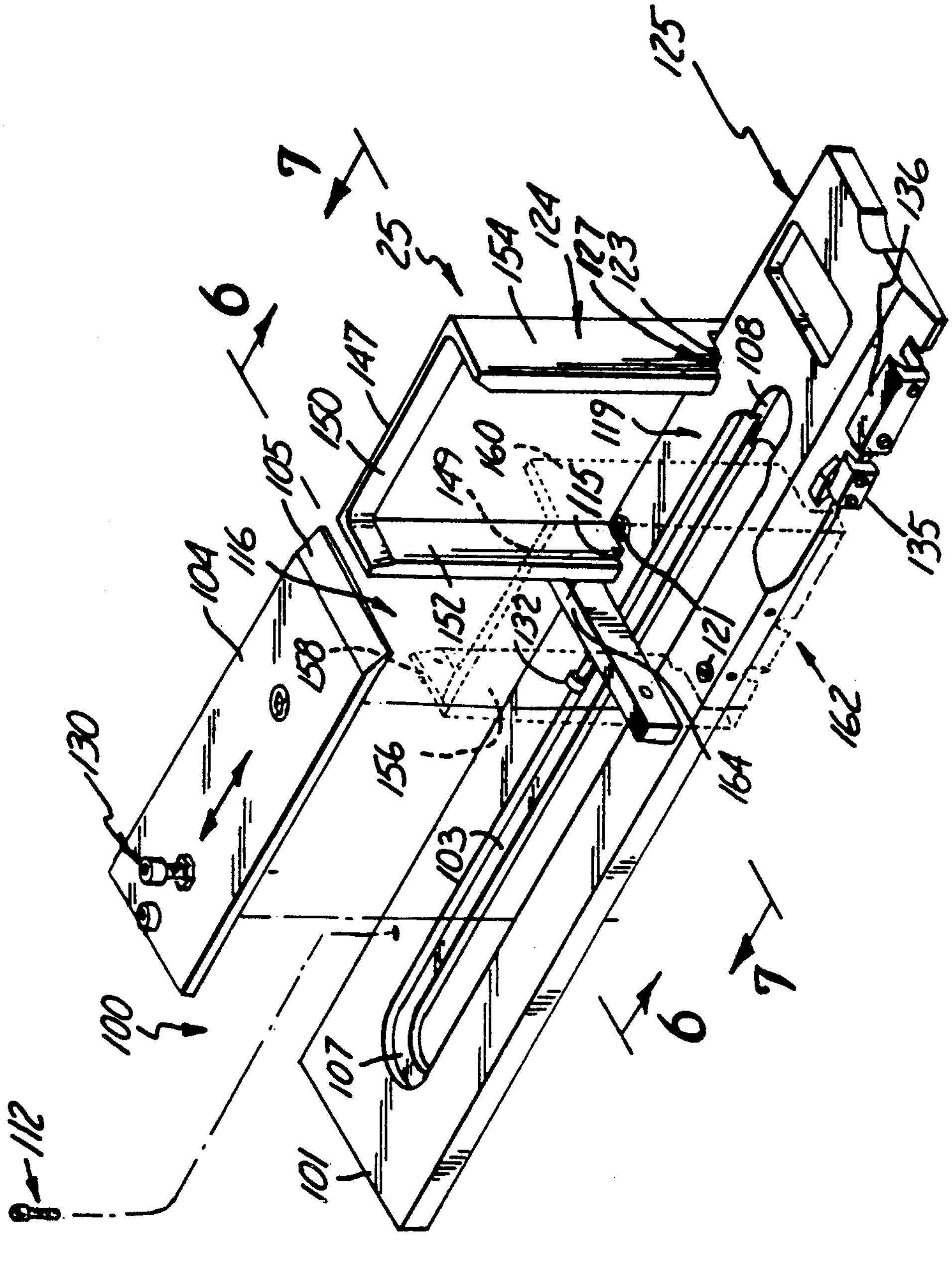
FIG. 5 is a perspective view of the ejector track and slide magazine as shown in FIGS. 2-4.

As shown in FIG. 5, the slide track 125 includes a frame separator 135 to open the insertion opening of the slide mount 15 to receive a film transparency 12. The slide mounts 15 are stacked in the slide magazine 25 so that the insertion opening thereof aligns with the frame separator 135 when ejected from the slide magazine 25 by the slide ejector 100. A lower retainer ledge 136 and an upper retainer ledge (not shown) hold the slide mount 15 open to receive the film transparency 12 at the insertion station 40.

As previously explained, after the slide mount 15 is positioned at the insertion station 40, the motorized drive assembly synchronously advances the film web 13 along the film track 30 and advances a severed film transparency 12 into the slide mount 15 positioned at the insertion station 40. As shown in FIGS. 2-4, upper and lower film guides 137 and 139 are included at the insertion station 40 to guide the severed film transparency 12 into the opened slide mount 15. Upper and lower film guide attachments 141 and 143 maintain the upper and lower film guides 137 and 139 respectively, for operation. A lid 145 covers the insertion station 40 during operation and supports the upper film guide 137. The lower film guide 139 is supported in cooperation with the frame 17 of the slide mounter 10. After the slide ejector 100 delivers the slide mount 15 to the insertion station 40, the slide ejector 100 is returned to seat against the retracted stop 112 of the ejector track 101 for the next operation cycle (FIG. 2).

As shown in more detail in FIGS. 5–7, the slide magazine 25 is mounted along the ejector track 101 in alignment with the advancing slide ejector 100. Thus, the ejector track 101 forms the bottom supporting surface 119 of the slide magazine 25. The ejector slot 103 of the ejector track 101 extends along the bottom supporting surface 119 through the slide magazine 25.

The slide magazine 25 is formed of a first support 147 and a second support 149 (shown in phantom in FIG. 5). The supports 147 and 149 are formed of generally "C" shaped members. The first support 147 is defined by a support side 150 and first and second extensions 152 and 154. The second support 149 is defined by a support side 156 and first and second extensions 158 and 160. The first and second supports 147 and 149 are mounted along an outer edge of the ejector track 101 with the support sides 150 and 156 in parallel alignment with the ejector slot 103. Screws 162A–D (FIGS. 6 and 7) secure the first and second supports 147 and 149 to the ejector track 101. The first extensions 152 and 158 of the first and second supports 147 and 149 define the rear end 116 of the slide magazine 25 (FIG. 6). The second extensions 154 and 160 cooperate to define the front end 124 of the slide magazine (FIG. 7).

As shown in FIGS. 5 and 6, a cross bar 164 connects the first extensions 152 and 158 of the rear end 116 of the slide magazine 25. The first extensions 152 and 158 have bottom recessed edges 166 and 168, (FIG. 6) respectively, which cooperate with the ejector track 101 to define the rear slide ejector opening 115 between the ejector track 101 and the slide magazine 25 through which the ejector pusher 104 of the slide ejector 100 extends. The width of the rear slide ejector opening 115 coincides with the width of the ejector pusher 104, which is smaller than the width of the slide mount 15. The elevating screws 121 secured to the bottom supporting surface 119 of the slide magazine 25 are laterally offset from the rear slide ejector opening 115 (FIG. 6). The offset placement of the elevating screws 121 permits the ejector pusher 104 to extend through the rear slide ejector opening 115 of the slide magazine 25 without interference.

As shown in FIGS. 5 and 7, the second extensions 160 and 154 have stepped bottom edges 170 and 172, respectively, which form a pair of superimposed slots, a first lower slot defining the slide mount opening 123 and a second slot, above the first slot having a second smaller width, defining the front slide ejector opening 127 through which the ejector pusher 104 of the slide ejector 101 extends. The ejector slot 103 extends beyond the front end 124 of the slide magazine 25 so that the advanced end 108 of slot 103 is positioned outside the slide magazine 25 to permit the ejector pusher 104 to extend through the front slide ejector opening 127. The width of the front slide ejector opening 127 corresponds to the width of the ejector pusher 104 and the width of the slide mount opening 123 corresponds to the Width of the slide mount 15.

Figure 8:
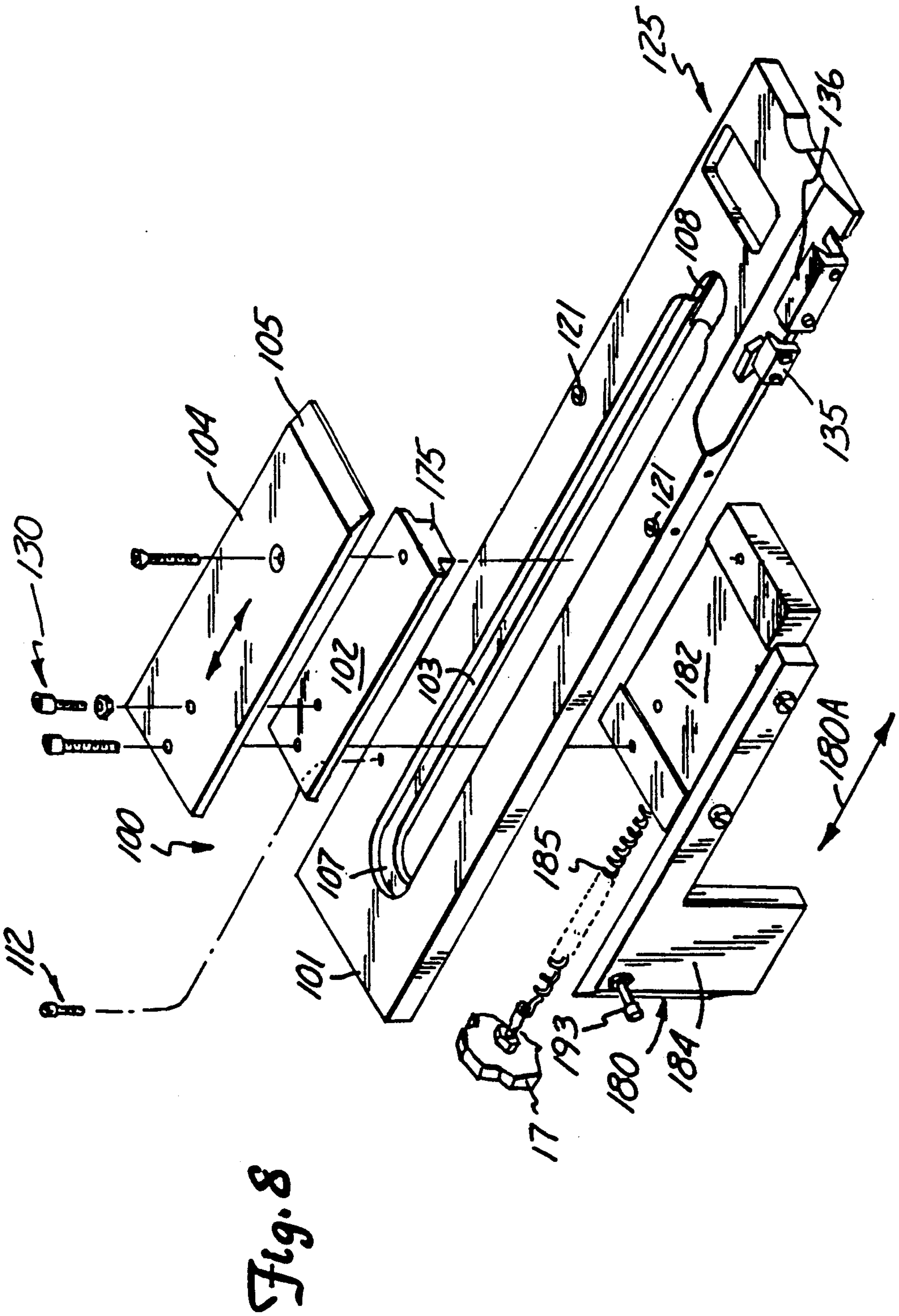
FIG. 8 is an exploded perspective view of the slide ejector and actuator assembly as shown in FIGS. 2-4.

The construction of the slide ejector 100 is shown in more detail in FIG. 8. The slide ejector mount 102 includes an extension 175 configured for insertion into and movable along the ejector slot 103 of the ejector track 101 generally between the retracted end 107 and the advanced end 108. Thus, the extension 175 slidably mounts the slide ejector 100 along the ejector track 101.

Figure 9:
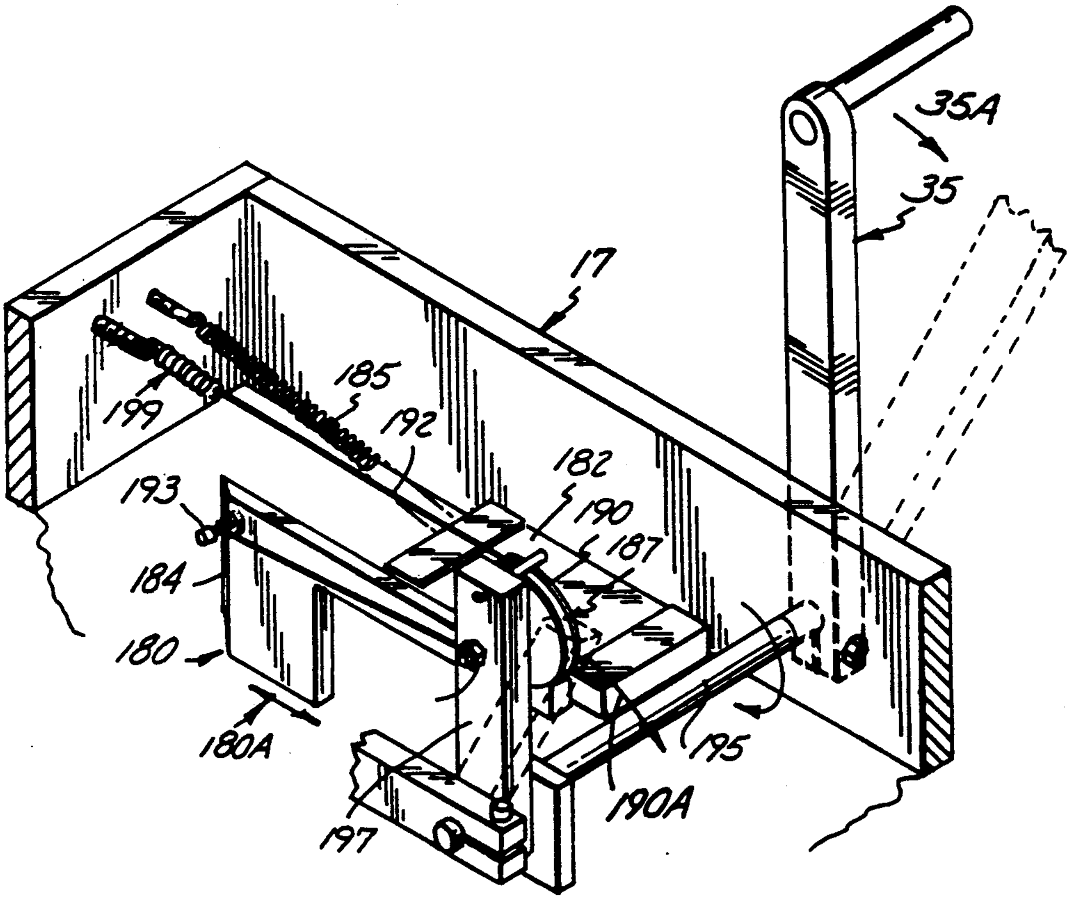
FIG. 9 is a perspective view of the actuator assembly as shown in FIG. 8 with the addition of a pulley assembly for operating the actuator assembly.

For each operation cycle of the slide mounter 10, an actuator assembly 180 moves the ejector 100 along the ejector track 101 from the retracted stop 112 toward the advanced end 108 to eject a slide mount 15 from the slide magazine 25. The actuator assembly 180 includes an actuator plate 182 and an actuator connector 184 connected to the actuator plate 182. The actuator plate 182 is attached to a lower surface of the extension 175 of the slide ejector 100 opposite from the ejector pusher 104. A release spring 185 connects the actuator plate 182 to the frame 17 of the slide mount 10. The actuator assembly 180 is moved back and forth (arrow 180A) relative to the ejector track 101 in combination with the operating lever 35 (FIG. 9). As shown in FIG. 9, the operation of the actuator assembly 180 is linked to the operating lever 35 via a pulley assembly 187.

The pulley assembly 187 includes a pulley 190 and pulley cable 192. The pulley 190 is moved forward (arrow 190A) to cooperatively advance the actuator connector 184. The advancement of the pulley 190 is transferred to the actuator connector 184 through the operation of the pulley cable 192 which is attached at one end to a pulley attachment 193 connected to the actuator connector 184 and at the other end is rigidly fixed to the frame 17 of the slide mounter 10.

The pulley 190 is advanced forward in combination with the operating lever 35 which, when depressed, rotates a drive shaft 195. The pulley 190 is linked to the drive shaft 195 through a drive connection 197. Since one end of the pulley cable 192 is rigidly fixed to the frame 17, the other end, attached to the actuator connector 184, must advance the actuator plate 182 in combination with the advancement of the pulley 190 and drive connection 197 (advanced position of drive connection 197 shown in phantom in FIG. 9). Thus, when the operating lever 35 is rotated for operation (arrow 35A), it rotates the drive shaft 195 to advance the pulley 190 forward (arrow 190A) via the drive connection 197. The movement of the pulley 190 is transferred to the actuator plate 182 via the pulley cable 192 to move the slide ejector 100 for operation. The pulley cable 192 includes a spring 199 at the fixed end thereof to accommodate for override if the operating lever 35 is further depressed after the stop contacts 130 and 132 mate and the slide ejector 100 reaches the ejection position.

After the slide mount 15 is positioned at the insertion station 40 and the operating lever 35 released, the slide ejector 100 is forced toward the retracted end 107 of the ejector track 101 by the release spring 185. More specifically, when the operating lever 35 is released, the force applied by the pulley assembly 187 is released which causes the release spring 185 connecting the actuator plate 182 to the frame 17 to force the slide ejector 100 toward the retracted stop 112 for the next operation cycle (FIG. 2).

The slide ejector 100 further includes an inhibitor mechanism (not shown) for restricting operation when the number of slide mounts 15 stacked in the slide magazine 25 becomes small.

Although the present invention has been described with reference to a preferred embodiment, workers skilled in the art will recognize that changes may be made in form and detail without departing from the spirit and scope of the invention.

What is claimed is:

1. An apparatus for advancing a slide mount to an insertion station of a slide mounting apparatus of the type having a slide magazine for holding a plurality of mounts in stacked relation, the slide mounts being discharged from the slide magazine through a slide mount opening aligned with a slide track and advanced along the slide track to an insertion station to receive a film transparency therein, the apparatus comprising:

a slide ejector movable between an ejection position and a retraction position for advancing a bottom slide mount from the slide magazine to the insertion station, the slide ejector extending through a rear slide ejector opening of the slide magazine to contact a bottom slide mount to advance the slide mount through the slide mount opening of the slide magazine;

means for advancing the slide ejector from the retraction position to the ejection position;

means for retracting the slide ejector from the ejection position to the retraction position; and positioning means for aligning an upper surface of the bottom slide mount at or above an upper edge of a front contact surface of the slide ejector while maintaining the bottom slide mount in a position to be engaged by the contact surface of the slide ejector as the slide ejector moves from the retraction position through the rear slide ejector opening toward the ejection position.

2. The apparatus of claim 1 wherein the positioning means includes an elevating screw extending from a bottom supporting surface of the slide magazine to contact a lower surface of the bottom slide mount, the height of the elevating screw having a height which aligns the upper surface of the bottom slide mount at or above an upper edge of the front contact surface of the slide ejector

3. The apparatus of claim 2 wherein the slide ejector is movable between the ejection position and the retraction position along an ejector track aligned with the slide magazine.

4. The apparatus of claim 3 including a retracted stop mounted on the ejector track for engaging the slide ejector to define a retraction position for the slide ejector along the slide track.

5. The apparatus of claim 3 including a stop contact mounted on the slide ejector for engaging a corresponding stop contact mounted on the slide magazine to define an ejection position for the slide ejector along the ejector track.

6. The apparatus of claim 3 wherein the slide ejector includes an ejector pusher defining the front contact surface for the slide ejector and an extension for insertion into a transverse ejector slot of the ejector track and movable therealong to advance the ejector pusher through the rear slide ejector opening of the slide magazine to contact the bottom slide mount to eject it from the slide magazine.

7. The apparatus of claim 6 wherein the supporting surface of the slide magazine is formed of a portion of the ejector track and the ejector slot extends under the slide magazine to advance the ejector pusher through the rear slide ejector opening of the slide magazine to contact the slide mount.

8. The apparatus of claim 7 wherein the elevating screw is laterally offset from the rear slide ejector opening and the ejector slot to permit the slide ejector to advance along the ejector track through the rear slide ejector opening without interference.

9. The apparatus of claim 8 wherein the slide magazine further includes a front slide ejector opening through which the ejector pusher extends to completely eject the bottom slide mount from the slide magazine.

10. The apparatus of claim 6 wherein the height of the front contact surface of the pusher is thicker than the slide mount to define a significant front contact surface.

11. The apparatus of claim 1 where the front contact surface of the slide ejector is significantly thicker than the thickness of the slide mount.

12. The apparatus of claim wherein the positioning means includes first and second elevating elements positioned within the slide magazine and on opposite sides of a path of the slide ejector for elevating a rear portion of the bottom slide mount.

13. An apparatus for advancing a slide mount to an insertion station of the slide mounting apparatus of the type having a slide magazine for holding a plurality of slide mounts in stacked relation, the slide mounts being discharged from the slide magazine through a slide mount opening aligned with a slide track and advanced along the slide track to an insertion station to receive a film transparency therein, the apparatus comprising:

a slide ejector movable between an ejection position and a retraction position for advancing a bottom slide mount from the slide magazine to the insertion station, the slide ejector extending through a rear slide ejector opening of the slide magazine to contact a bottom slide mount to advance the slide mount through the slide mount opening of the slide magazine;

means for advancing the slide ejector from the retraction position to the ejection position;

means for retracting the slide ejector from the ejection position to the retraction position; and positioning means for aligning an upper surface of a rear portion of the bottom slide mount at or above an upper edge of a front contact surface of the slide ejector while maintaining the bottom slide mount in a position to be engaged by the contact surface of the slide ejector as the slide ejector moves from the retraction position through the rear slide ejector opening toward the ejection position.

14. The apparatus of claim 13 wherein the positioning means includes an elevating screw extending from a bottom supporting surface of a rear portion of the slide magazine to contact a lower surface of the bottom slide mount, the height of the elevating screw having a height which aligns the upper surface of the rear portion of the bottom slide mount at or above an upper edge of the front contact surface of the slide ejector.

* * * * *

UNITED STATES PATENT AND TRADEMARK OFFICE
CERTIFICATE OF CORRECTION

PATENT NO. : 5,195,653

DATED : March 23, 1993

INVENTOR(S) : WILBUR GERRANS

It is certified that error appears in the above-identified patent and that said Letters Patent is hereby corrected as shown below:

Col. 8, line 55, delete "claim", insert --claim 1--

Signed and Sealed this

Thirtieth Day of November, 1993

Attest:

Bruce Lehman

BRUCE LEHMAN

*Attesting Officer*

*Commissioner of Patents and Trademarks*